United States Patent [19]

Adcock

[11] Patent Number: 5,327,562
[45] Date of Patent: Jul. 5, 1994

[54] METHOD FOR IMPLEMENTING VIRTUAL FUNCTION TABLES IN A COMPILER FOR AN OBJECT-ORIENTED PROGRAMMING LANGUAGE

[75] Inventor: James L. Adcock, Bellevue, Wash.

[73] Assignee: Microsoft Corporation, Redmond, Wash.

[21] Appl. No.: 880,168

[22] Filed: May 6, 1992

[51] Int. Cl.$^5$ .............................................. G06F 9/45
[52] U.S. Cl. .............................. 395/700; 364/DIG. 1; 364/280.4
[58] Field of Search ...................... 395/700; 364/280.4

[56] References Cited

U.S. PATENT DOCUMENTS 5,093,914  3/1993  Coplien et al. ........................ 395/700

OTHER PUBLICATIONS

Ellis, Margaret A. and Bjarne Stroustrup, *The Annotated C++ Reference Manual*, Addison-Wesley Publishing Company, 1990, pp. 217-237.
Saran, Cliff and Paul Kemp, "The OWL, the Framework, His Vision and Her Workshop," *EXE*, vol. 6, No. 6, Nov., 1991, p. 14.
Goldberg, Adele and David Robson, *Smalltalk-80; The Language and its Implementation*, Addison-Wesley Publishing Company, 1983, excerpts.
Budd, Timothy, *An Introduction to Object-Oriented Programming*, Addison-Wesley Publishing Company, 1991, pp. 281-301.

*Primary Examiner*—Gareth D. Shaw
*Assistant Examiner*—A. Katbab
*Attorney, Agent, or Firm*—Seed & Berry

[57] ABSTRACT

A method for a computer compiler for an object-oriented programming language for implementing virtual functions is provided. In preferred embodiments of the present invention, the virtual function table for a class contains a tile table and a plurality of sub-tables. The tile table contains pointers to the sub-tables, and the sub-tables contain pointers to the virtual function members of the class. Each child class shares a sub-table of the parent class when the child class does not override a function in that sub-table. If the child class overrides a function, then the child is allocated its own sub-table. Each virtual function member for a class is identified by a tile table offset and a sub-table offset.

16 Claims, 7 Drawing Sheets

METHOD FOR IMPLEMENTING VIRTUAL FUNCTION TABLES IN A COMPILER FOR AN OBJECT-ORIENTED PROGRAMMING LANGUAGE

TECHNICAL FIELD

This invention relates generally to the field of compilers for computer programming languages and, more specifically, to compilers for languages having object-oriented features.

BACKGROUND OF THE INVENTION

The use of object-oriented programming techniques can facilitate the development of complex computer programs. Programming languages that support object-oriented techniques have been developed. One such programming language is C++.

Two common characteristics of object-oriented programming languages are support for data encapsulation and data type inheritance. Data encapsulation refers to the binding of functions and data. Inheritance refers to the ability to declare a data type in terms of other data types.

In the C++ language, object-oriented techniques are supported through the use of classes. A class is a user-defined type. A class declaration describes the data members and function members of the class. For example, the following declaration defines the data members and the function member of a class named CIRCLE.

```
class CIRCLE
{int x, y;
 int radius;
 void draw( );
};
```

Variables x and y specify the center location of a circle and variable radius specifies the radius of the circle. These variables are referred to as data members of the class CIRCLE. The function draw is a user-defined function that draws the circle of the specified radius at the specified location. The function draw is referred to as a function member of class CIRCLE. The data members and function members of a class are bound together in that the function operates an instance of the class. An instance of a class is also called an object of the class.

In the syntax of C++, the following statement declares the objects a and b to be of type class CIRCLE.

CIRCLE a, b;

This declaration causes the allocation of memory for the objects a and b, such an allocation is called an instance of the class. The following statements assign data to the data members of objects a and b.

a.x=2;
a.y=2;
a.radius=1;
b.x=4;
b.y=5;
b.radius =2;

The following statements are used to draw the circles defined by objects a and b.

a.draw( );
b.draw( );

A derived class is a class that inherits the characteristics—data members and function members—of its base classes. For example, the following derived class CIRCLE_FILL inherits the characteristics of the base class CIRCLE.

```
class CIRCLE_FILL : CIRCLE
{int pattern;
    void fill( );
};
```

This declaration specifies that class CIRCLE_FILL includes all the data and function members that are in class CIRCLE in addition to the those data and function members introduced in the declaration of class CIRCLE_FILL, that is, data member pattern and function member fill. In this example, class CIRCLE_FILL would have data members x, y, radius, and pattern and function members draw and fill. Class CIRCLE_FILL is said to "inherit" the characteristics of class CIRCLE. A class that inherits the characteristics of another class is a derived class (e.g., CIRCLE_FILL). A class that does not inherit the characteristics of another class is a primary class (e.g., CIRCLE). A class whose characteristics are inherited by another class is a base class (e.g., CIRCLE is a base class of CIRCLE_FILL). A derived class may inherit the characteristics of several classes, that is, a derived class may have several base classes. This is referred to as multiple inheritance.

A class may specify whether its function members are to be virtually inherited. Declaring that a function member is virtual means that the function can be overridden by a function of the same name and type in a derived class. In the following example, the function draw is declared to be virtual in classes CIRCLE and CIRCLE_FILL.

```
class CIRCLE
{int x, y;
 int radius;
 virtual void draw( );
};
class CIRCLE_FILL : CIRCLE
{int pattern;
    virtual void draw( );
};
```

Continuing with the example, the following statement declares object a to be of type class CIRCLE and object b to be of type class CIRCLE_FILL.

CIRCLE a;
CIRCLE_FILL b;

The following statement refers to the function draw as defined in class CIRCLE.

a.draw( );

Whereas, the following statement refers to the function draw defined in class CIRCLE_FILL.

b draw( );

Moreover, the following statements type cast object b to an object of type class CIRCLE and invoke the function draw that is defined in class CIRCLE_FILL.

```
CIRCLE c;
c_ptr *CIRCLE;
c_ptr = &b;
c_ptr → draw( ); // CIRCLE_FILL::draw( )
```

Thus, the type casting preserves the call to the overriding function CIRCLE_FILL::draw.

Although object-oriented techniques facilitate the development of complex computer programs, the resulting computer programs can be less efficient in execution speed and require more memory than a program developed without object-oriented techniques. It would be desirable to have method and system for implementing the techniques of object-oriented programming to improve the execution speed and reduce the memory requirements of the computer program.

SUMMARY OF THE INVENTION

It is an object of the present invention to provide improved methods of implementing virtual functions in a compiler for an object-oriented programming language It is another object of the present invention to provide an improved compiler for an object-oriented programming language that reduces the run-time storage requirements for a class.

It is another object of the present invention to provide a method in a compiler for an object-oriented programming language in which virtual function tables can be shared between a derived class and a base class.

These and other objects of the invention, which will become more apparent as the invention is described more fully below, are obtained by providing an improved computer system. The computer system provides a virtual function table for a class having a plurality of function members. The virtual function table includes a tile table and a plurality of sub-tables. The computer system allocates a plurality of sub-tables, each sub-table having entries; allocates a tile table for the class, the tile table containing an entry for each allocated sub-table; stores in each tile table entry a pointer to an allocated sub-table; and stores in each sub-table entry a pointer to the executable code associated with a virtual function member. In a preferred embodiment, a child class is allocated its own tile table, but the child class shares the sub-tables of a parent class when the child class does not override any of the functions associated with the sub-table.

DETAILED DESCRIPTION OF THE INVENTION

Figure 1A:
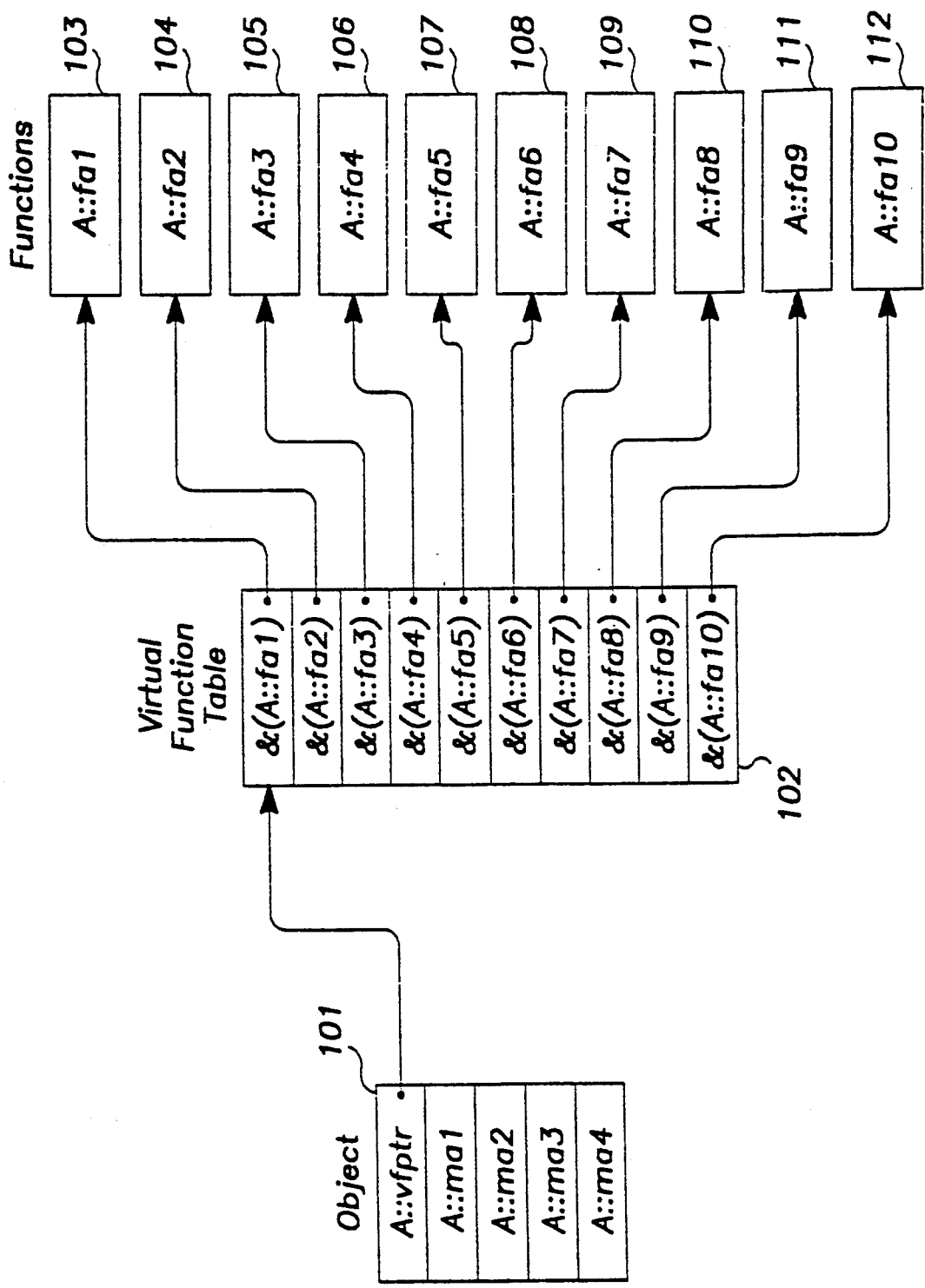
FIG. 1A is a schematic diagram of the object data structure, the virtual function table, and the function members of class A of a prior art system.

The present invention provides an improved method and system for implementing the object-oriented techniques of virtual functions. A preferred embodiment of the present invention is C++ compiler that implements virtual functions as described herein. Although the present invention is described in terms of a compiler for the C++ programming language, one skilled in the art would appreciate that the methods of the present invention are applicable to other programming languages that support virtual functions.

In a preferred embodiment, the compiler defines an object data structure for each class. If a class introduces a virtual function or has an overriding function, then the compiler allocates a virtual function table for the class. The class object data structure contains the layout of the data members and a virtual function table pointer. The virtual function table pointer is initialized during run time to point to the virtual function table associated with the class. During compile time, the compiler initializes the virtual function table with addresses corresponding to virtual functions.

Virtual Function Table

A virtual function table for a class contains addresses corresponding to the virtual function members associated with that class. The virtual function table is used at run time to invoke the virtual functions indirectly. Each primary class with a virtual function member has an associated virtual function table. The virtual function table contains the addresses of each virtual function member. The object data structure for such a class contains a virtual function table pointer (vfptr). When memory for an object is allocated at run time, the virtual function table pointer is initialized with the address of the associated virtual function table. Thus, all objects of the same class type point to the same virtual function table. To implement the invoking of a virtual function, the compiler generates code to access the virtual function member through the virtual function table.

Classes A and B as declared below are used to illustrate the methods of the present invention. Class A is an example of a primary class with 4 data members and 10 virtual function members.

| class A | |
|---|---|
| { | int ma1; |
|  | int ma2; |
|  | int ma3; |
|  | int ma4; |
| virtual | int fa1( ); |
| virtual | int fa2( ); |
| virtual | int fa3( ); |

```
          virtual        int fa4( );
          virtual        int fa5( );
          virtual        int fa6( );
          virtual        int fa7( );
          virtual        int fa8( );
          virtual        int fa9( );
          virtual        int fa10( );
     };
```

Class B is an example of a derived class that inherits the data and function members of class A and that declares 2 data members and 5 function members. Function members fa7( ) and fa8( ) override the functions of the same name that are inherited from class A. Also, class B introduces function members fb11( ), fb12( ), and fb13( ).

```
          class B : A
          {       int mb1;
                  int mb2;
                  virtual int fa7( );
                  virtual int fa8( );
                  virtual int fb11( );
                  virtual int fb12( );
                  virtual int fb13( );
          };
```

Figure 1B:
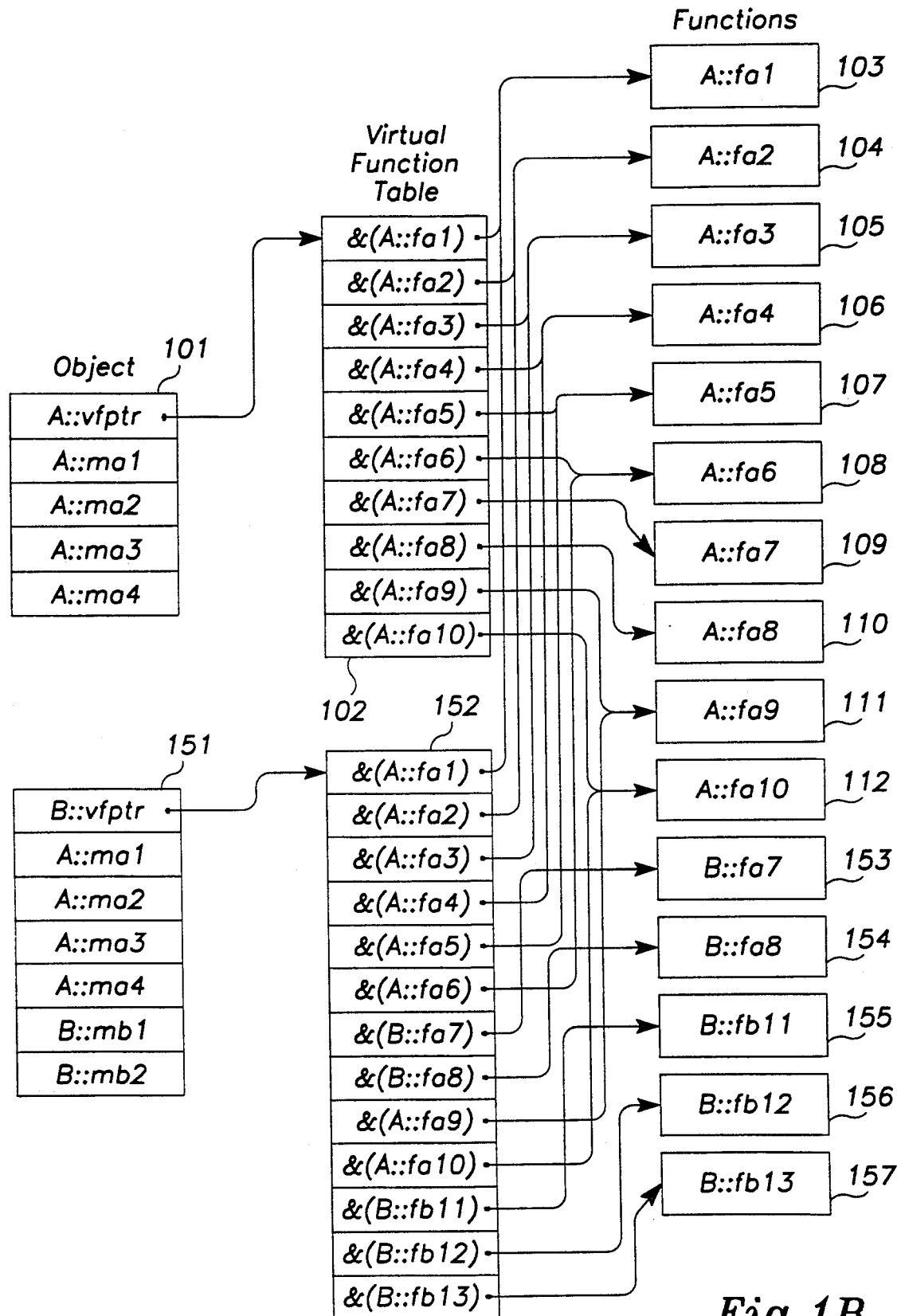
FIG. 1B is a schematic diagram of the data structures for class A and the object data structure, the virtual function table, and the introduced and overriding function members of class B of a prior art system.

FIG. 1A is a schematic diagram of the object data structure 101, the virtual function table 102, and the function members 103–112 of class A of a prior art system. The object data structure 101 contains the virtual function pointer A::vfptr and the data members A::ma1, A::ma2, A::ma3, and A::ma4. The virtual function table 102 contains pointers to each of the function members 103–112. The function members 103–112 contain the code for the functions. FIG. 1B is a schematic diagram of the data structures for class A and the object data structure 151, the virtual function table 152, and the introduced and overriding function members 153–157 of class B of a prior art system. The object data structure 151 contains the virtual function pointer B::vfptr to the virtual function table 152 of class B, the data members defined in class A, and the data members B::mb1 and B::mb2 of class B. The virtual function table 152 contains pointers to each of the function members 103–108, 111, 112, and 153–157 of class B. In this prior art system, each derived class has a virtual function table that contains an entry for each virtual function in the parent class and an entry for each function introduced in the derived class. A virtual function for a class is identified by an offset into the virtual function table for the class. When a virtual function is to operate on an object, the virtual function table pointer for the object is retrieved, the function offset is added, and the address of the function is retrieved.

Figure 1C:
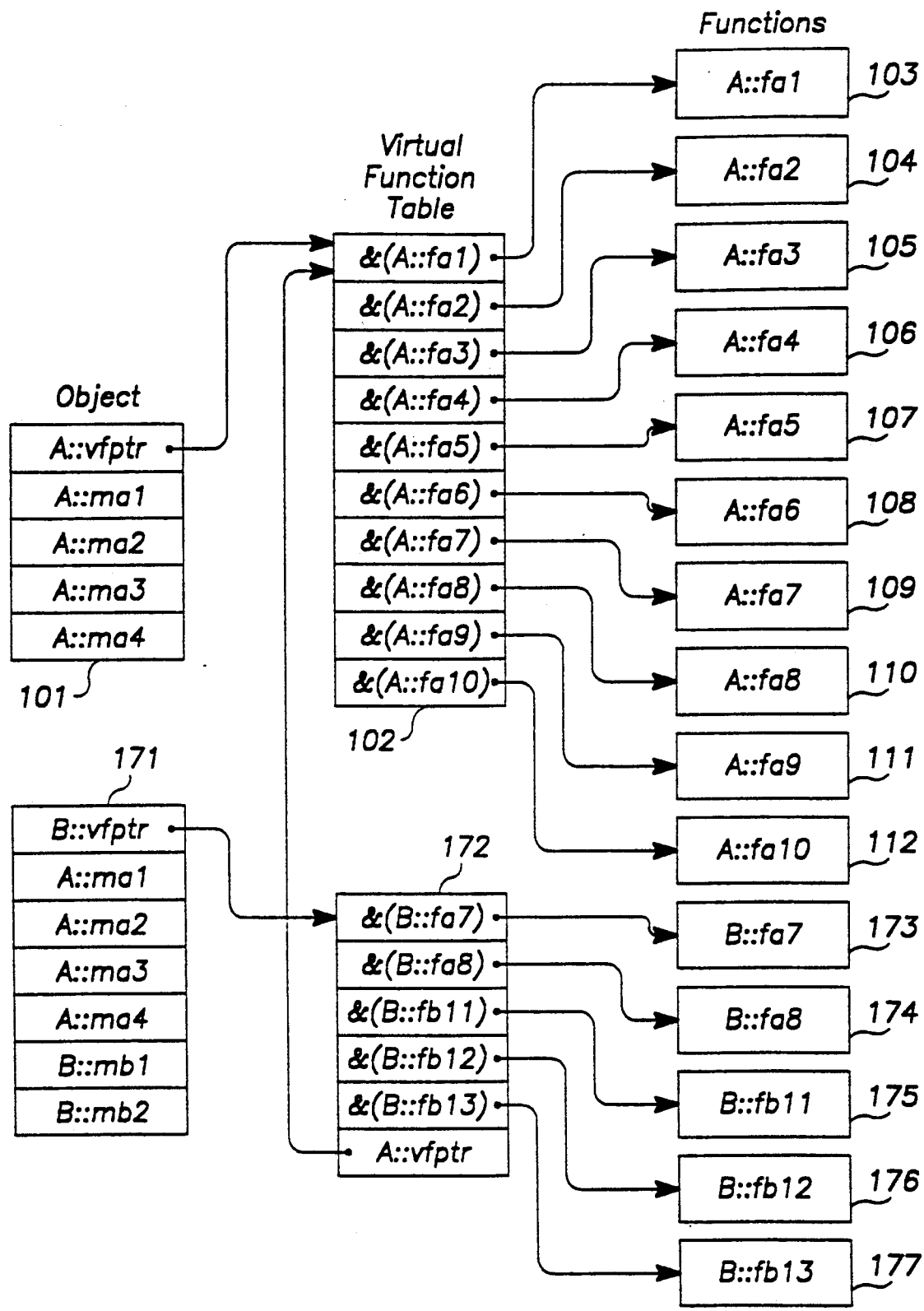
FIG. 1C is a schematic diagram of the data structures for class A and the object data structure, the virtual function table, and the overriding and introduced function members of class B of a prior art system.

FIG. 1C is a schematic diagram of the data structures for class A and the object data structure 171, the virtual function table 172, and the overriding and introduced function members 173–177 of class B of another prior art system. The object data structure 171 contains the virtual function pointer B::vfptr to the virtual function table 172 of class B, the data members of class A, and the data member B::mb1 and B::mb2 of class B. The virtual function table 172 contains pointers to and names of the introduced and overriding function members 173–177 of class B and the virtual function pointer A::vfptr to the virtual function table 102 of class A. The function members 173–177 contain the code for the overriding and introduced functions of class B. In the prior system shown in FIG. 1C, the virtual function tables use a minimal number of entries: one entry for each virtual function member that is introduced or overriding and one entry for each base class. A derived class effectively shares the virtual function tables of its base classes. Each virtual function table entry contains, in addition to the pointer to the function, the name of the function. To determine the location of a function in a derived class, the system during run time scans the virtual function table for the derived class and then the virtual function tables for the base classes until a function with that name is located.

Figure 2A:
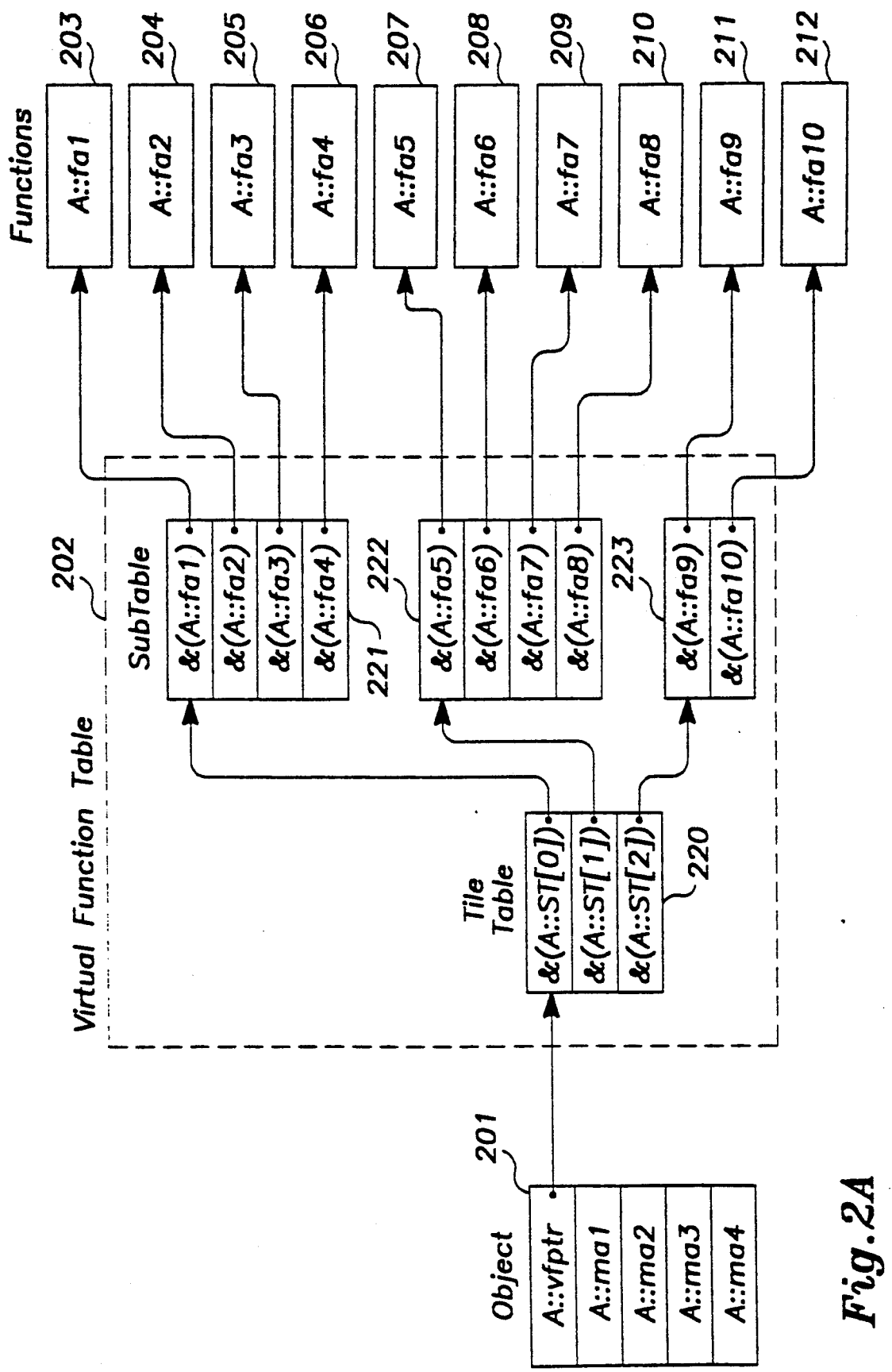
FIG. 2A is a schematic diagram of the object data structure, the virtual function table, and the function members of class A in a preferred embodiment of the present invention.
Figure 2B:
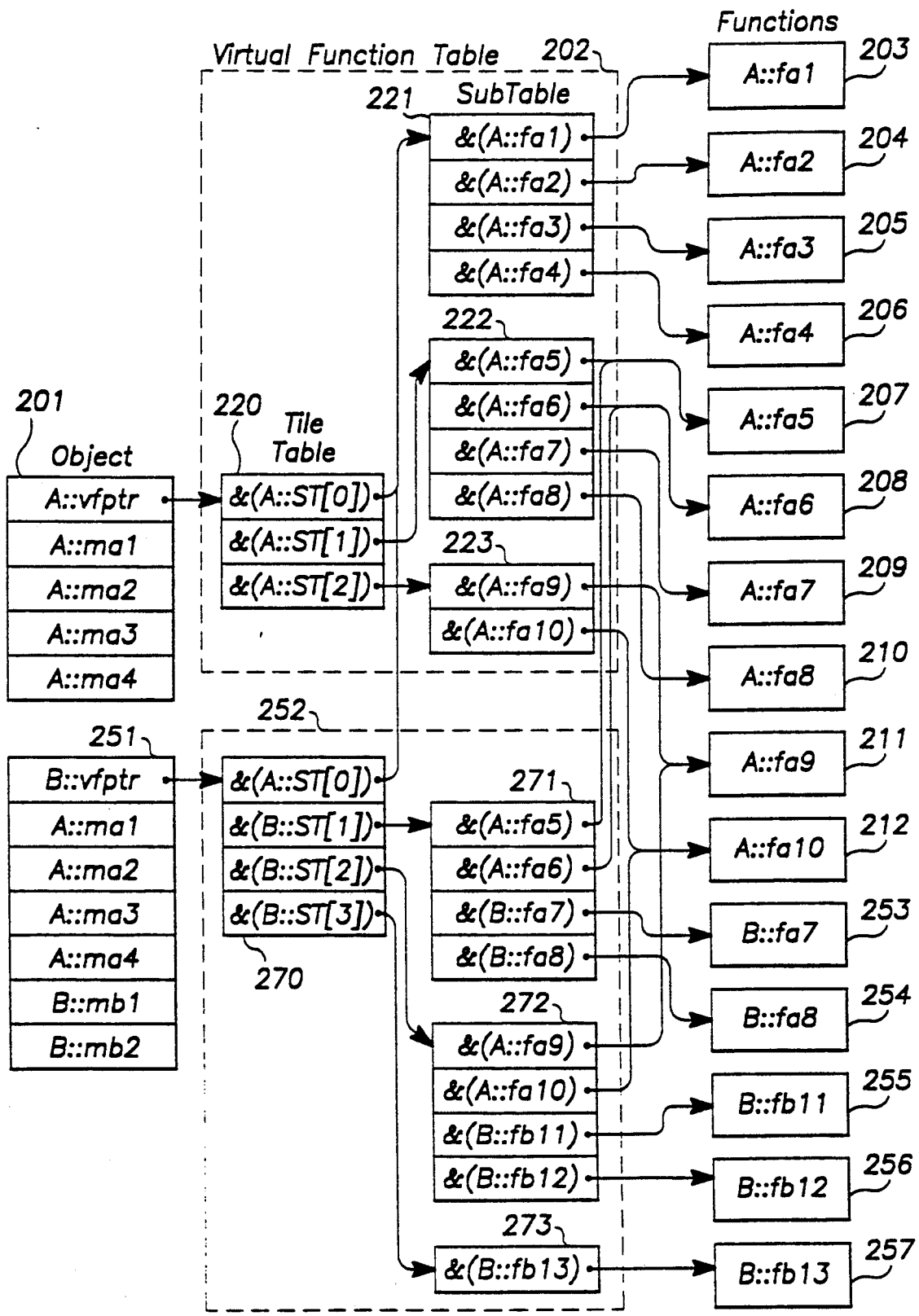
FIG. 2B is a schematic diagram of the data structure for class A, and the object data structure, the virtual function table, and the overriding and introduced functions of class B in a preferred embodiment of the present invention.

FIG. 2A is a schematic diagram of the object data structure 201, the virtual function table 202, and the function members 203–212 of class A in a preferred embodiment of the present invention. The object data structure 201 contains the virtual function table pointer A::vfptr and data members A::ma1, A::ma2, A::ma3, and A::ma4. The functions 203–212 contain the code for virtual functions A::fa1 through A::fa10. The virtual function table 202 contains the tile table 220 and the sub-tables 221, 222, 223. The virtual function table 202 provides two-level indirect addressing to the virtual functions. The tile table 220 contains pointers to the sub-tables 221, 222, 223. The sub-tables contains pointers to the virtual functions 203–212. Each sub-table, except for the last, contains 4 pointers. In preferred embodiments, the sub-table size is a power of 2. The virtual function table pointer of object data structure 201, A::vfptr, points to the tile table 220. FIG. 2B is a schematic diagram of the class structure for class A, and the object data structure 251, the virtual function table 252, and the overriding and introduced functions 253–257 of class B. The object data structure 252 contains the virtual function table pointer B::vfptr, the data members of class A, and the data members B::mb1 and B::mb2 of class B. The virtual function table 252 contains the tile table 270 and the sub-tables 271–273. The tile table 270 contains pointers to sub-tables 271, 272, and 273. The sub-tables contain pointers to the functions of class B. The function members 253–257 contain the code for the introduced and overriding function of class B. In a preferred embodiment, the functions are identified by a tile table index and a sub-table index. If the sub-table size is a power of 2, then the function identifier can be conveniently represented as an integer. For example, if the sub-table size is 16, then the low order 4 bits represent the index into a sub-table and the remaining high order bits represent the index into the tile table.

Figure 3:
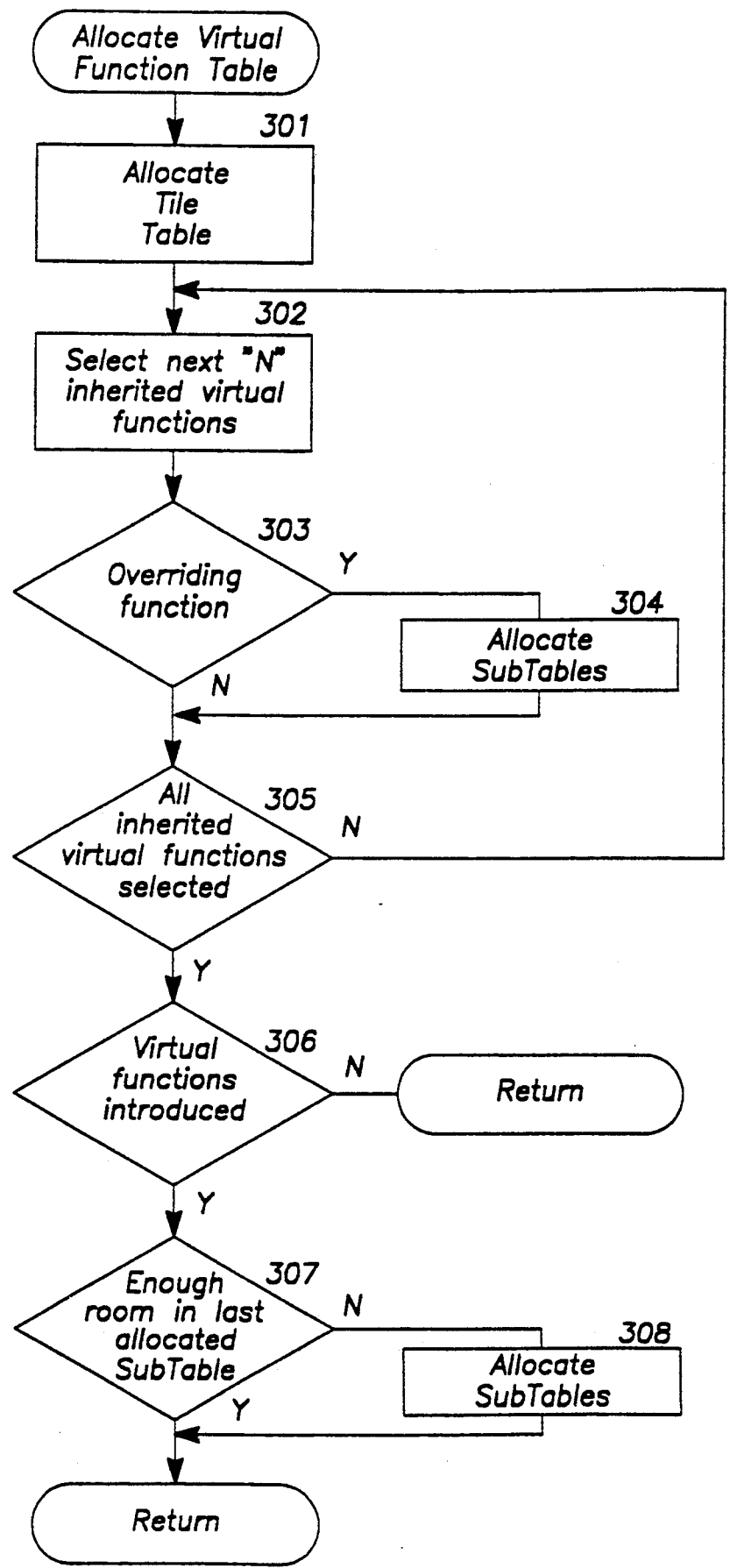
FIG. 3 is a flow diagram of a method to allocate a virtual function table in a preferred embodiment of the present invention.

FIG. 3 is a flow diagram of a method to allocate a virtual function table in a preferred embodiment of the present invention. The input to this method is a class declaration. In step 301, the system allocates a tile table for the input class. The tile table size is the ceiling of the number of inherited virtual functions plus the number of introduced virtual functions divided by the standard size of the sub-tables. For example, in FIG. 2B class B inherits 10 virtual functions and introduces 3 virtual functions. The standard sub-table size is four. Thus, the tile table 270 has four entries ($\lceil(10+3)/4\rceil$). The size of the last sub-table is smaller than the standard sub-table size when the number of functions (inherited plus introduced) is not an even multiple of the standard sub-table size. In step 302, the system selects the next "n" inherited virtual functions, where "n" is the standard sub-table size. In step 303, if the input class overrides a selected inherited virtual function, then a new sub-table is needed and the system continues at step 304, else the system continues at step 305. In step 304, the system allocates a new sub-table for the input class. In step 305, if all the inherited virtual functions have been selected, then the system continues at step 306, else the system loops to step 302 to select the next inherited virtual functions. In step 306, if the input class introduces a virtual function, then the system continues at step 307, else the allocation is done and the system returns. In step 307, if there is enough room in the last sub-table processed to hold all the pointers to the introduced virtual functions, then the allocation is done and the system returns, else the system continues at step 308. In step 308, the system allocates enough sub-tables for the introduced functions and returns.

Figure 4:
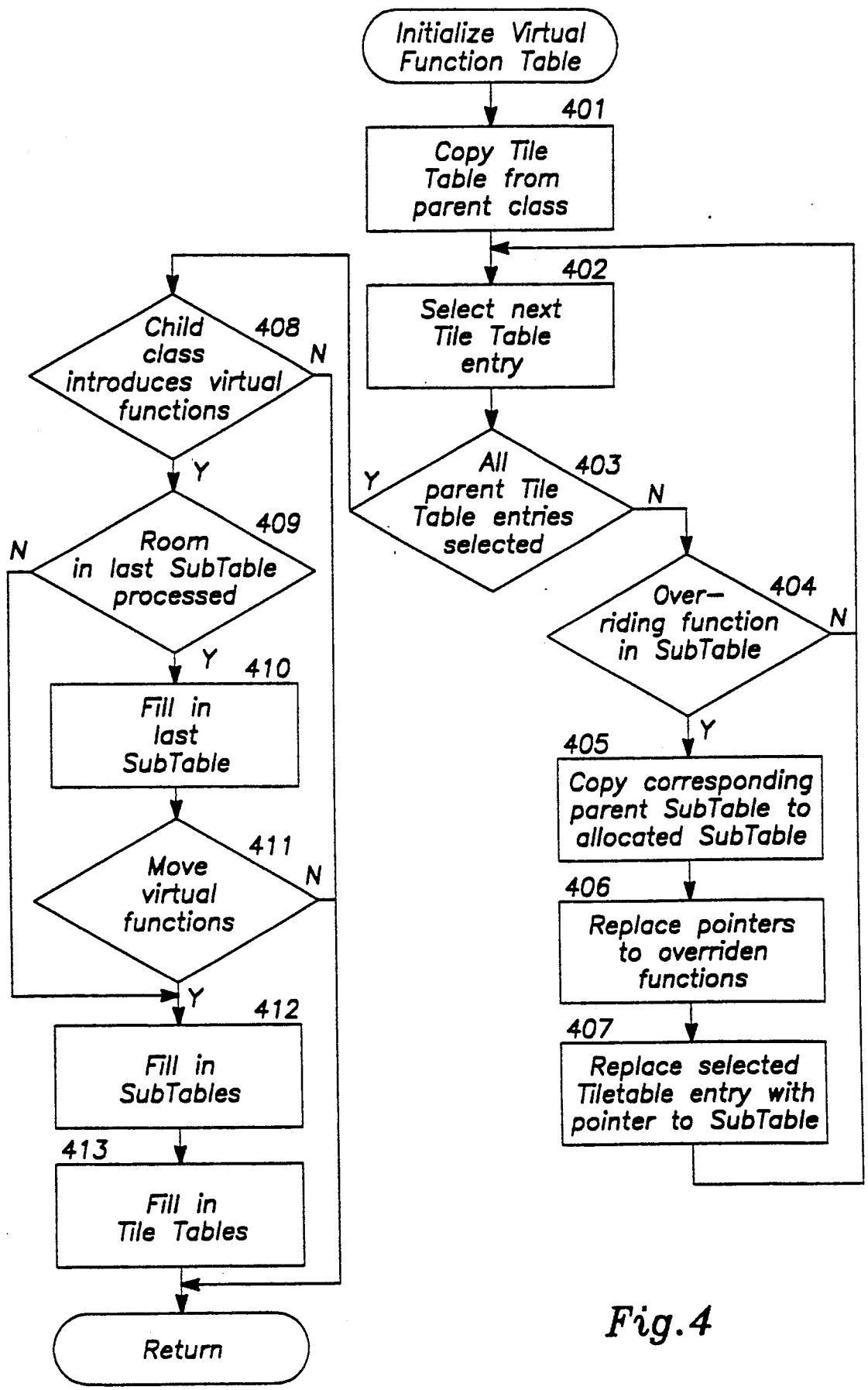
FIG. 4 is a flow diagram of a method to initialize a virtual function table in a preferred embodiment of the present invention.

FIG. 4 is a flow diagram of a method to initialize a virtual function table in a preferred embodiment of the present invention. The input to this method is a class definition and the allocated virtual function table. In step 401, the system copies the tile table of the parent class of the input class to the tile table of the input class. In steps 402 through 407, the system initializes the sub-tables that were allocated in the method of FIG. 3 with pointers to inherited or overriding functions. In step 402, the system selects the next tile table entry and corresponding sub-table, starting with the first. In step 403, if all the tile table entries that were copied from the parent class have been processed, then the system continues at block 408, else the system continues at step 404. In step 404, if the input class defines an overriding function that is in the selected sub-table, then the system continues at step 405, else the input class can share the sub-table of the parent class and the system loops to step 402 to select the next sub-table. In step 405, the system copies the selected sub-table to a sub-table allocated for the input class. In step 406, the system replaces the pointers to the overridden functions in the allocated sub-table with the pointers to the overriding functions. In step 407, the system replaces the selected tile table entry with a pointer to the allocated sub-table for the input class and loops to step 402 to process the next tile table entry and sub-table. In steps 408 through 413, the system stores the pointers to the introduced virtual functions in the allocated sub-tables. In step 408, if the input class introduces a virtual function, then the system continues at step 409, else the initialization is done and the system returns. In step 409, if there is room in the last sub-table allocated in the method of FIG. 3, then the system continues at step 410, else the system continues at step 412. In step 410, the system fills in the last sub-table allocated with pointers to introduced virtual functions. In step 411, if there are more introduced virtual functions than can fit into last sub-table allocated, then the system continues at step 412, else the initialization is done and the system returns. In step 412, the system fills in the remaining allocated sub-tables with pointers to the introduced virtual functions. In step 413, the system fills in the tile table with pointers to the allocated sub-tables that contain only introduced virtual functions.

Although the methods of the present invention are described without reference to multiple inheritance, the methods are easily adapted in the manner described in U.S. patent application Ser. No. 07/682,537, entitled, A METHOD FOR IMPLEMENTING VIRTUAL FUNCTIONS AND VIRTUAL BASES IN A COMPILER FOR AN OBJECT-ORIENTED PROGRAMMING LANGUAGE," which is hereby incorporated by reference.

Although the methods and systems of the present invention have been disclosed and described herein primarily with respect to preferred embodiments designed to be used in a compiler for a C++ programming language, the invention is not intended to be limited by such embodiments. Rather, the present invention is intended to include all legally equivalent embodiments including those designed for use with other programming languages which implement virtual functions.

What is claimed is:

1. A method in a computer system for generating a virtual function table for a class, the class specifying an object type in an object-oriented environment, the computer system having memory, the class having a plurality of virtual function members, each virtual function member having associated executable code, the virtual function table having a tile table and a plurality of sub-tables, the method comprising the steps of:

receiving a class definition for the class;

after receiving the class definition, allocating a plurality of sub-tables in the memory, each sub-table having entries;

allocating a tile table for the class in the memory, the tile table containing an entry for each allocated sub-table;

storing in each tile table entry a pointer to an allocated sub-table;

storing in each sub-table entry a pointer to the executable code associated with a virtual function member; and generating computer code to access the executable code of the virtual function members of the class through the tile table and the sub-tables.

2. A method in a computer system for generating a virtual function table for a child class, the computer system having an associated memory, the child class defined in terms of a parent class and function members, the parent class having a plurality of virtual function members, the parent class having a virtual function table, the parent virtual function table comprising a parent tile table and a plurality of parent sub-tables, the parent tile table containing pointers to the parent sub-tables, the parent sub-tables containing pointers to the parent virtual function members, the child class having a function member that overrides a virtual function member of the parent class, the method comprising the steps of:

receiving a class definition for the child class;

after receiving the class definition, allocating a tile table for the child class in the memory, the child tile table containing an entry for each sub-table in the parent class; and for each parent tile table entry, when the sub-table pointed to by the parent tile table entry does not contain a pointer to a virtual function member that is overridden in the child class, storing the parent tile table entry in the child tile table; and when the sub-table pointed to by the parent tile table entry contains a pointer to a function member that is overridden in the child class, allocating a sub-table for the child class in the memory, and storing a pointer to the overriding function member in the allocated sub-table; and generating instructions for accessing the function members of the child class through the child tile table and sub-tables.

3. A method in a computer system for accessing a virtual function member for a class, the class having a virtual function table and a plurality of virtual function members, the virtual function members having associated executable code, the virtual function table having a tile table and a plurality of sub-tables, the tile table containing pointers to the sub-tables, the sub-tables containing pointers to the executable code of the virtual function members, each virtual function member having a unique identifier, the unique identifier indicating a tile table entry and a sub-table entry, the method comprising the steps of:

receiving an identification of an object of the class;
receiving the unique identifier for a virtual function member of the class to be invoked for the object;
retrieving the tile table entry of the virtual function table indicated by the received unique identifier;
retrieving a sub-table entry from the sub-table pointed to by the retrieved tile table entry, the sub-table entry indicated by the received unique identifier; and
executing the executable code pointed to by the retrieved sub-table entry to effect the accessing of the virtual function member for the class.

4. A method in a computer system for compiling a computer program, the computer program having a class definition for a class, the method comprising the steps of:

receiving the class definition, the class definition including a plurality of virtual function members;
allocating a plurality of sub-tables for the class in accordance with the received class definition, each sub-table having entries, each entry containing a reference to executable code for a virtual function member;
allocating a tile table for the class, the tile table containing an entry for each allocated sub-table;
storing in each tile table entry a reference to an allocated sub-table;
storing in each sub-table entry of each allocated sub-table a reference to executable code for a virtual function member; and
generating code to access the executable code of the virtual function members through the tile table and the sub-tables.

5. The method as recited in claim 4 wherein the step of allocating a plurality of sub-tables includes the step of allocating a sub-table with a number of entries that is a power of two.

6. The method as recited in claim 4 wherein the step of storing in each sub-table entry includes storing an indirect reference through another sub-table to executable code for a virtual function member.

7. A method in a computer system for compiling a computer program, the program having a parent class definition for a parent class, the parent class definition including a plurality of virtual function members, the parent class having a tile table and a plurality of sub-tables, the tile table containing reference to the sub-tables, the sub-tables containing references to the virtual function members of the parent class, the method comprising the steps of:

receiving a class definition of a child class, the child class definition inheriting the parent class definition and containing a function member that overrides a virtual function member of the parent class;
allocating a tile table for the child class, the child tile table containing a reference to each sub-table of the parent class;
for each reference to a sub-table in the parent tile table,
when the referenced sub-table does not contain a reference to a virtual function member that is overridden in the child class, storing the reference to the child tile table; and
when the referenced sub-table contains a reference to a virtual function member that is overridden in the child class, allocating a sub-table for the child class, storing a reference to the allocated sub-table in the child tile table, and storing a reference to the overriding virtual function member in the allocated sub-table; and
generating code to access a non-overridden function member indirectly through the child tile table and a parent sub-table and an overridden function member indirectly through the child tile table and child sub-table.

8. The method as recited in claim 7 wherein the step of allocating a plurality of sub-tables includes the step of allocating a sub-table with a number of entries that is a power of two.

9. A method in a computer system for accessing a virtual function member of a class during execution of an object-oriented program, the method comprising the steps of:

receiving a unique identifier for a virtual function member of the class;
identifying a tile table indicated by the received unique identifier;
retrieving a tile table entry of the identified tile table;
identifying a sub-table indicated by the retrieved tile table entry;
retrieving a sub-table entry from the identified sub-table, the sub-table entry indicated by the received unique identifier; and
executing executable code pointed to by the retrieved sub-table entry to effect the accessing of the virtual function member for the class.

10. A method in a computer system for generating a virtual function table from a class definition of a class, the method comprising the steps of:

receiving the class definition for the class, the class definition specifying virtual function members of the class;
allocating a plurality of virtual function member reference tables for the virtual function table, each virtual function member reference table having entries, each entry containing a reference to a virtual function member;
allocating an index table for the virtual function table, the index table containing an entry for each allocated virtual function member reference table;
storing in each virtual function member reference table entry of each allocated virtual function member reference table a reference to the executable code of a virtual function member; and
generating code to access the virtual function members through the index table and the virtual function reference tables.

11. A method in a computer system for generating a virtual function for a child class, the computer system having an associated memory, the child class defined in terms of a parent class and function members, the parent class having a plurality of virtual function members, the parent class having a virtual function table, the parent virtual function table comprising a parent tile table and a plurality of parent sub-tables, the parent tile table containing pointers to the parent sub-tables, the parent sub-tables containing pointers to the parent virtual function members, the child class having a function member that overrides a virtual function member of the parent class, the method comprising the steps of:

receiving a child class definition;

after receiving the child class definition, allocating a tile table for the child class in the memory, the child tile table containing an entry for each sub-table in the parent class;

copying each entry of the parent tile table into an entry of the child tile table;

for each parent tile table entry, when the sub-table pointed to by the parent tile table entry contains a pointer to a virtual function member that is overridden in the child class, allocating a sub-table for the child class in the memory, storing a pointer to the allocated sub-table in the child tile table, and storing a pointer to the overriding function member in the allocated sub-table; and generating computer code to access function members through the child tile table and the sub-tables.

12. A method in a computer system for compiling a computer program, the computer system having a class, the class having a class definition, the method comprising the steps of:

receiving the class definition of the class, the class definition specifying a plurality of virtual function members;

generating a two-level virtual function table for the class, the two-level virtual function table containing references to the virtual function members of the class; and generating computer code to access the virtual function members through the two-level virtual function table.

13. The method of claim 12 wherein the step of generating a two-level virtual function table includes the steps of:

allocating a tile table, the tile table having tile table entries;

allocating a plurality of sub-tables, the sub-tables having sub-table entries; and storing into each tile table entry a reference to a sub-table and storing into each sub-table entry a reference to a virtual function member.

14. The method of claim 12 including the steps of:

receiving a child class definition of a child class that inherits the class, the child class definition specifying a virtual function member that overrides a virtual function member of the inherited class; and allocating a two-level virtual function table for the child class that shares a portion of the virtual function table of the inherited class.

15. A method in a computer system for compiling a computer program, the computer program having a parent class definition of a parent class and having a child class definition of a child class, the parent class and the child class having a plurality of virtual functions, the child class inheriting the parent class, the method comprising the steps of:

receiving the class definitions of the child class and the parent class;

allocating a parent virtual function table for the parent class, the parent virtual function table having a first and a second level, the first level parent virtual function table having references to a plurality of second level parent virtual function tables, the second level parent virtual function tables having references to virtual functions of the parent class;

allocating a child virtual function table for the child class, the child virtual function table having a first and a second level, the first level child virtual function table having entries wherein an entry in the first level child virtual function table refers to a second level parent virtual function table when the virtual functions referred to by the second level parent virtual function table are not overridden by a virtual function of the child class; and generating computer code to access the virtual functions of the child class through both the child virtual function table and the parent virtual function table.

16. The method of claim 15 wherein an entry of the first level child virtual function table refers to a second level child virtual function table when a virtual function referred to by the second level child virtual function table overrides a virtual function of the parent class.

* * * * *

UNITED STATES PATENT AND TRADEMARK OFFICE
CERTIFICATE OF CORRECTION

PATENT NO. : 5,327,562
DATED : July 5, 1994
INVENTOR(S) : James L. Adcock

It is certified that error appears in the above-identified patent and that said Letters Patent is hereby corrected as shown below:

In column 10, claim 11, line 67, after "function" and before "for" insert therefor --table--

In column 11, claim 12, line 30, please delete "system" and substitute therefor --program--.

Signed and Sealed this

Twenty-seventh Day of September, 1994

Attest:

BRUCE LEHMAN

Attesting Officer    Commissioner of Patents and Trademarks